(12) United States Patent
Allen et al.

(10) Patent No.: US 7,375,802 B2
(45) Date of Patent: May 20, 2008

(54) RADAR SYSTEMS AND METHODS USING ENTANGLED QUANTUM PARTICLES

(75) Inventors: Edward H. Allen, Lancaster, CA (US); Markos Karageorgis, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 187 days.

(21) Appl. No.: 11/198,829

(22) Filed: Aug. 4, 2005

(65) Prior Publication Data

US 2007/0296953 A1    Dec. 27, 2007

(51) Int. Cl.
*G01C 3/08* (2006.01)

(52) U.S. Cl. .................. 356/4.01; 356/28; 342/105; 342/118

(58) Field of Classification Search ........... 356/28, 356/4.01
See application file for complete search history.

(56) References Cited

U.S. PATENT DOCUMENTS

| | | | |
|---|---|---|---|
| 5,796,477 A * | 8/1998 | Teich et al. ............... 356/318 |
| 6,512,488 B2 | 1/2003 | Schantz | |
| 6,822,605 B2 | 11/2004 | Brosche | |
| 6,864,827 B1 | 3/2005 | Tise et al. | |
| 2001/0053608 A1* | 12/2001 | Williams et al. .......... 438/706 |
| 2002/0003213 A1* | 1/2002 | Mukasa et al. ............ 250/310 |
| 2002/0034191 A1 | 3/2002 | Shattil | |
| 2003/0031279 A1* | 2/2003 | Blount et al. ............. 375/346 |
| 2003/0043071 A1* | 3/2003 | Lilly et al. ................ 342/368 |
| 2003/0053071 A1* | 3/2003 | James et al. .............. 356/491 |
| 2003/0123045 A1* | 7/2003 | Riegl et al. ................ 356/4.01 |
| 2003/0133714 A1 | 7/2003 | Gat | |
| 2003/0176176 A1* | 9/2003 | Leinonen et al. ......... 455/277.1 |
| 2005/0025200 A1* | 2/2005 | Santori et al. ............. 372/25 |
| 2005/0280814 A1* | 12/2005 | Iuliano ...................... 356/301 |
| 2007/0002307 A1* | 1/2007 | Zaugg ....................... 356/5.01 |

OTHER PUBLICATIONS

Kuklewicz et al., A High-Flux Entanglement Source Based on a Doulby-Resonant Optical Parametric Amplifier, pp. 1-12.
Tittel et al., Violation of Bell Inequalities by Photons More Than 10 km Apart, Physical Review Letters, vol. 81, No. 17, pp. 3563-3566, Oct. 26, 1998.
S. Takeuchi et al., Development of a High-Quantum-Efficiency Single-Photon Counting System, Applied Physics Letters, vol. 74, No. 8, pp. 1063-1065, Feb. 22, 1999.
H. Lee et al., Entanglement Generates Entanglement: Entanglement Transfer by Interaction, Physics Letters A, 338, pp. 192-196 (2005).
K. Mishima et al., Entangelement in Scattering Processes, Physics Letters A, 333, pp. 371-377 (2004).
Miller et al., Demonstration of a Low-Noise Near Infrared Photon Counter with Multiphoton Discrimination, Applied Physics Letters, vol. 83, No. 4, pp. 791-793, Jul. 28, 2003.

(Continued)

*Primary Examiner*—Thomas H. Tarcza

(57) ABSTRACT

An entangled quantum particle generator generates a signal including a plurality of entangled particles. The wavelength of the signal is the sum of the wavelengths of the entangled particles. A signal processor determines a characteristic of the target based on information derived from at least some of the entangled particles in the return signal. The frequency of the signal is selected to propagate the signal through a medium and the frequencies of the entangled particles are selected to provide sufficient data in the return signal to resolve the characteristic of the target.

27 Claims, 5 Drawing Sheets

OTHER PUBLICATIONS

C. Emary et al., Entangled Microwaves from Quantum Dots, arXiv:cond-mat/0502550 v1, pp. 1-4, Feb. 23, 2005.

Nazir et al., Creating Excitonic Enganglement in Quantum Dots Through the Optical Stark Effect, arXiv:quant-ph/0406123 v2, pp. 1-5, Nov. 3, 2004.

Giovannetti et al., Generating Entangled Two-Photon States with Coincident Frequencies, arXiv:quant-ph/0109135 v3, pp. 1-4, Jun. 18, 2002.

Giovannetti et al., Quantum-Enhanced Measurements: Beating the Standard Quantum Limit, Science, www. sciencemag.org., vol. 306, pp. 1330-1336, Nov. 19, 2004.

Z. Ficek et al., Entangled States and Collective Nonclassical Effects in Two-Atom Systems, Physics Reports 372, www.elsevier.com/locate/physrep. pp. 369-443, 2002.

B. Sun et al., Atom-Photon Entanglement Generation and Distribution, Physical Review, vol. 69 042316, pp. 1-6, 2004.

V.I. Yukalov, Entanglement Production Under Collective Radiation, arXiv:cond-mat/0411305 v1, Nov. 11, 2004.

Boto et al., Quantum Interferometric Optical Lithography: Exploiting Entanglement to Beat the Diffraction Limit, Physical Review Letters, The American Physical Society, vol. 8, No. 13, pp. 2733-2736, Sep. 25, 2000.

Giovannetti, et al., Quantum-Enhanced Measurements: Beating the Standard Quantum Limit, arXiv:quant-ph/0412078 v1, pp. 1-11, Dec. 10, 2004.

Boto et al., Quantum Interferometric Optical Lithography: Exploiting Entanglement to Beat the Diffraction Limit, Phys. Rev. Lett., Ver. 2.1, May 3, 2000.

Lissandrin et al., Quantum Theory of Entangled-Photon Photoemission, The American Physical Society, Physical REview B 69, 165317, pp. 1-11, 2004.

Rauschenbeutel et al., Step-By-Step Engineered Multiparticle Entanglement, www.sciencemag.org, Science, vol. 288, pp. 2024-2028, Jun. 16, 2000.

P. Hariharan et al., Four-Photon Interferometry for Secure Quantum Key Distribution, Optics Express, vol. 10, No. 21, pp. 1222-1226, Oct. 21, 2002.

Gingrich et al., Quantum Entanglement of Moving Bodies, arXiv:quant-ph/0205179 v4, pp. 1-5, Dec. 7, 2002.

A. Sorensen et al., Many-Particle Entanglement with Bose-Einstein Condensates, arXiv:quant-ph/0006111 v2, pp. 1-4, Dec. 14, 2000.

Helmerson et al., Creating Massive Entanglement of Bose-Einstein Condensed Atoms, Physical Review Letters, vol. 87, No. 17, pp. 1-4, Oct. 22, 2001.

Reichel, Atom Chips, Scientific American, www.sciam.com, pp. 46-53, Feb. 2005.

Pe'er, et al., Temporal Shaping of Entangled Photons, Physical Review Letters, The American Physical Society, PRL 94, 073601, pp. 1-4 Feb. 25, 2005.

Dayan et al., Nonlinear Interactions with an Ultrahigh Flux of Broadband Entangled Photons, Physical Review Letters, The American Physical Society, PRL 94, 043602, pp. 1-4, Feb. 4, 2005.

Meyer et al., Global Entanglement in Multiparticle Systems, quant-ph/0108104, pp. 1-9, Jun. 1, 2001.

Bester et al., Theory of Excitonic Spectra and Entanglement Engineering in Dot Molecules, arXiv:cond-mat/0406725 v1, pp. 1-5, Jun. 29, 2004.

Quantum Entanglement and Teleportation, http://www.cakes.mcmail.com/StarTrek/teleportation.htm., pp. 1-8, 2005.

* cited by examiner

US 7,375,802 B2

RADAR SYSTEMS AND METHODS USING ENTANGLED QUANTUM PARTICLES

BACKGROUND

The "Rayleigh diffraction limit", which is the spatial resolution with which an object can be detected, is limited by the wavelength of the radiation used for detection. Higher frequencies are therefore required to resolve smaller objects.

Microwaves of high frequency are absorbed in the atmosphere at rates exponentially higher than microwaves of low frequency. Accordingly, low frequency radar is preferred for longer range. However, due to the Rayleigh diffraction limit, the ability to distinguish two objects adjacent to each other, referred to as "resolving power", is proportional to the ratio of wave length to aperture. As a result, for a unit aperture, radar can only distinguish an object if the wavelength of the electromagnetic radiation is the same or smaller than the object. The Rayleigh diffraction limit combined with the earth atmosphere's attenuation profile forces radar designers to choose between long range at low resolution, or short range at high resolution. In an extreme example, penetrating radars such as foliage penetrating radar (FOPEN) or ground penetrating radar (GPR) require low frequencies to minimize attenuation within the penetrated medium. Consequently, only the very largest objects can be resolved, diminishing the utility of such radar systems.

According to concepts of quantum mechanics, a quantum system may exist in several states simultaneously corresponding to different values of a physical observable such as position, momentum, or spin. Changes among properties of entangled photons are correlated. The composite system is described by a nonseparable state, that is, a superposition of substates describing eigenstates of the specific observables. Each of these substates corresponds to eigenvalues of some set of observables (e.g., particles' positions). An entangled state can thus be put in different forms, each being adapted to the analysis of a specific detection procedure. In quantum entanglement, the quantum states of two or more particles are described with reference to each other, even though the individual objects may be spatially separated.

SUMMARY

It is thus desirable to provide a radar system capable of using long wavelengths for propagation range combined with short wavelengths to resolve small objects.

In some embodiments, an entangled quantum particle generator generates a signal including a plurality of entangled particles. The wavelength of the signal is the sum of the wavelengths of the entangled particles. A signal processor determines a characteristic of the target based on information derived from at least some of the entangled particles in the return signal. The frequency of the signal is selected to propagate the signal through a medium and the frequencies of the entangled particles are selected to provide sufficient data in the return signal to resolve the characteristic of the target.

Other embodiments include generating entangled photons, transmitting the entangled photons in a radio-frequency signal. The frequency of the signal is selected to propagate through a particular medium and the number of the entangled photons is determined by the desired resolution of the return signal. At least a portion of the entangled photons reflected by a target are detected.

BRIEF DESCRIPTION OF THE FIGURES

Embodiments of the present invention may be better understood, and their numerous objects, features, and advantages made apparent to those skilled in the art by referencing the accompanying drawings. The use of the same reference symbols in different drawings indicates similar or identical items.

DETAILED DESCRIPTION

Figure 1:
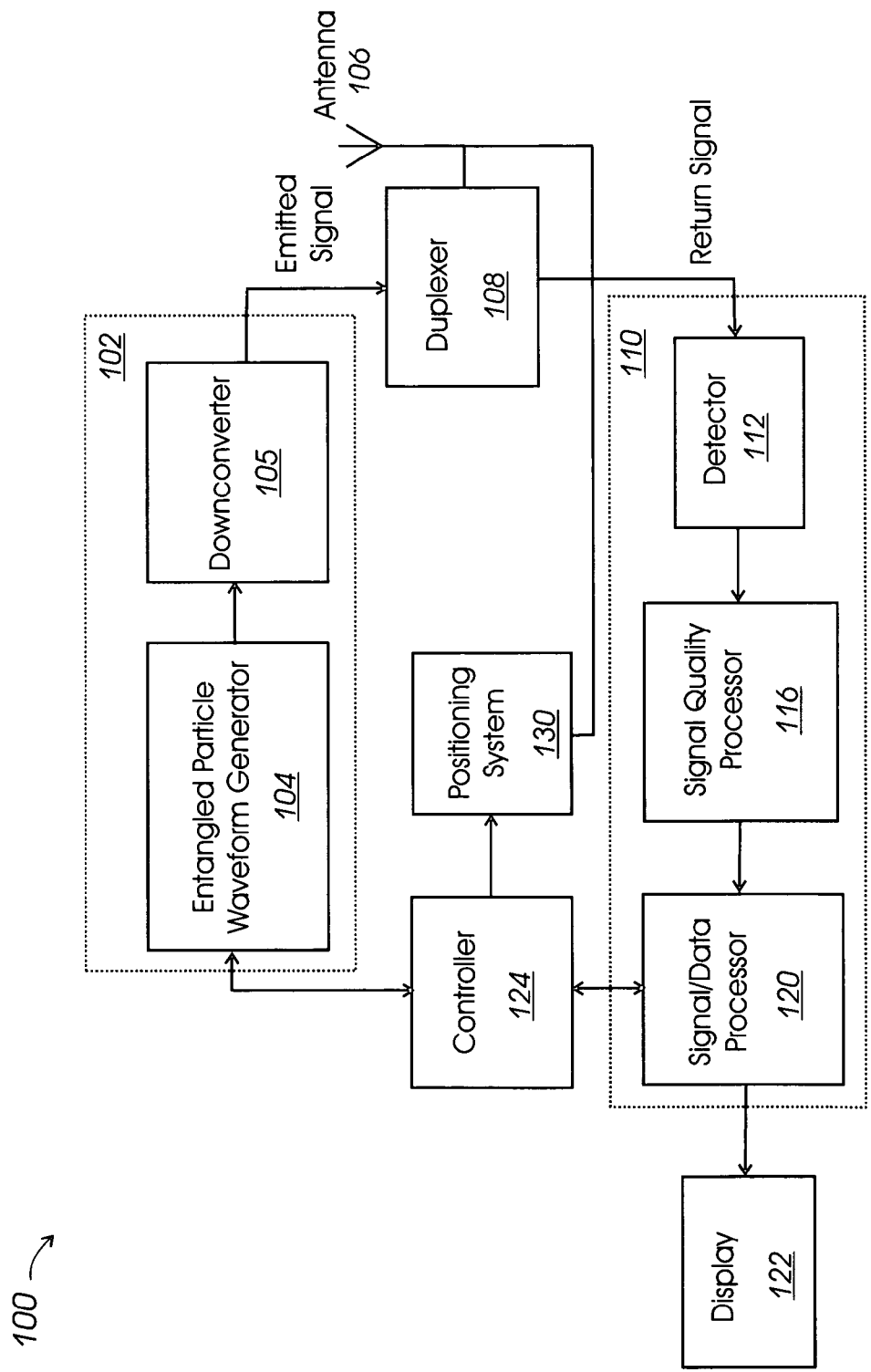
FIG. 1 is a schematic diagram of an embodiment of a quantum radar system.

Embodiments of systems and methods for radar systems using entangled quantum particles, referred to as quantum radar, are disclosed herein. Entangled beams allow the absorption spectrum and the resolution limit of quantum radar systems to be selected independently of one another. Thus, while classical radar systems must compromise between range and resolution, quantum radar systems can simultaneously achieve the low attenuation/high range associated with a long wave length and the high resolution associated with a short wave length.

The wavelength of a two or more entangled particle, referred to as a multiparticle, is proportional to the number of entangled particles associated with the multiparticle. For example, the wavelength of a pair of entangled photons is twice that of the single photon. The wavelength of three entangled photons is three times that of the single photon. For a foursome, the difference is a multiple of 4, and so on.

A measure of performance for classic radar systems is the signal to noise (S/N) ratio, which is directly proportional to the frequency of the signals. The higher the frequency, the higher the S/N ratio and, typically, the system performance.

Waves traveling at certain frequencies are absorbed in a medium when the wavelength of propagating photons is resonant with molecules in the medium, such as water molecules in air. Classical radar systems are typically limited to microwave frequencies due to absorption, leaving the far-infrared frequencies largely unused. Entangling photons into a multiphoton changes their resonance behavior and "detunes" them with respect to the absorption bands. Entangled radar waves can combine one or more particles with a relatively high frequency for resolution with one or more particles at a lower frequency for more effective propagation through various absorption bands in the atmosphere or other medium. The frequencies of the waves for propagation and resolution can be separately controlled, allowing the quantum radar system to use signals for resolution at previously unused frequencies. Thus, quantum radar is capable of providing information about targets that cannot be provided using classical radar systems.

In classical radar systems, return signal energy is proportional to the density of radiation power emanating from the antenna ($P_{avg}$), sprectral cross-section of the target ($\sigma$), area of aperture ($A_{eqv}$) (assuming receive and transmit antennas are the same size), and time on target ($t_{tot}$); and is inversely proportional to the distance to the target (R), the wavelength of the signal ($\lambda$), and a loss factor (L), as shown by the following equation:

$$\text{Signal Energy} = \frac{P_{avg} A_{eqv}^2 \sigma t_{tot}}{4\pi R^4 \lambda^2 L}$$

To determine the return signal energy for a quantum radar system, let c denote the speed of light, h denote Planck's constant, $E_{ef}$ denote the energy per entangled photon of frequency $\omega_{ef}$, $N_{efPmf}$ the number of entangled photons per multiphoton, and $N_{mf}$ the number of multiphotons per second. The wavelength associated with the entangled particles is determined using the deBroglie equation:

$$\lambda_{ef} = \frac{hc}{N_{efPmf} E_{ef}}$$

$$E_{ef} = h\omega_{ef} = hc/\lambda_{ef}$$

$$P_{avg} = E_{ef} N_{efPmf} N_{mf}/t_{tot}$$

then substituting the above terms into the classical radar signal energy equation, the signal energy for a quantum radar system is given by:

$$\text{Signal Energy}_{QR} = \frac{hc}{4\pi} N_{mf} \left( \frac{A_{eqv}^2 \sigma}{R^4 L} \right) \left( \frac{N_{efPmf}}{\lambda_{ef}} \right)^3$$

Thus, the signal energy of a radar system using entangled quantum particles is proportional to the cube of the number of entanglement photons per multiphoton. Note that the effective wavelength $\lambda_{ef}$ is inversely proportional to the number of entangled photons in a multiphoton. As a result, the return signals from the individual (entangled photons) photons can be used to achieve high target resolution while the wavelength of the multiphoton can be designed for effective propagation through the subject medium.

Range resolution in conventional radar systems is inversely proportional to the pulse width of the waveform generator signal. One technique to improve resolution despite the Rayleigh limit is referred to as "pulse compression," which compresses a long pulse temporally while maintaining the total energy of the pulse. Increased resolution is achieved at a cost of less image data per unit time.

Another technique to improve resolution despite the Rayleigh limit includes increasing the length scale of the aperture by using travel distance over a period of time to create a "synthetic" aperture. Synthetic Aperture Radar (SAR) systems increase resolution at the cost of extending the time required to collect an image. As a result, a reduced number of images can be collected in a given interval.

While increasing resolution in quantum radar systems requires an increase in energy per pulse, the penalty of longer exposure time is not incurred, as in classical radar systems that use techniques such as pulse compression and synthetic aperture. In military systems, longer exposure time increases the risk of the signal being detected. Note, however, that the time on target $t_{tot}$ cancels out of the signal energy equation for quantum radar systems, offering the advantages of high resolution, with lower probability of the signal being detected in tactical situations, compared to classical radar systems. According to the radar equation, a quantum radar system can focus more energy on the target per unit of aperture per unit time and extract more information than a comparable classical radar system.

One limitation in classical radar systems is that the ratio of imaging rate to resolution is fixed such that searching for and tracking targets cannot be accomplished simultaneously. Different radar systems, or complex radar systems capable of operating in interleaved modes, are required to detect ground and air moving targets. With quantum radar systems, however, the imaging rate to resolution ratio can be selected for simultaneous targeting, tracking, and even weapon guidance purposes. Additionally, multiphotons in multiple frequency ranges can be generated dynamically to propagate through different mediums and resolve different types of targets.

Referring to FIG. 1, a diagram of an embodiment of quantum radar system 100 is shown including transmitter section 102 with entangled particle waveform generator 104 and downconverter 105 that emits radar beams comprising entangled multiphoton waveforms. In some embodiments, signals are both transmitted and received via a single antenna 106. In such embodiments, duplexer 108 switches to provide the output of waveform generator 104 to antenna 106 during transmit mode. Note that in other embodiments, different antennas 106 can be used for transmit and receive functions.

Receiver section 110 typically includes detector 112, signal quality processor 116, and signal/data processor 120. The radar data generated by processor 120 as images and/or other suitable format can be provided to display 122 as well as other output devices such as a printer or storage media. Waveform generator 104 and signal/data processor 120 interface with controller 124. Controller 124 can provide signals to positioning system 130, which adjusts the direction in which radar beams are transmitted and received to provide improved information regarding a target.

Waveform generator 104 can be configured to generate single photon and/or multiphoton waveforms using a variety of different techniques and devices such as one or more atom cavities, quantum dots, Bose-Einstein condensates as well as other suitable devices for generating entangled photons.

Figure 2A:
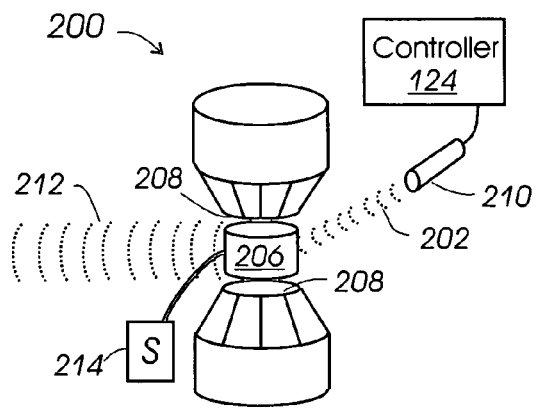
FIG. 2A is a diagram of an embodiment of an atomic cavity waveform generator that can be used in the radar system of FIG. 1.

FIG. 2A shows an embodiment of atom cavity 200 in which one or more energy beams 202 are directed to one or more atoms trapped in an enclosed cavity 206 formed by a field between two superconducting mirrors 208. One or more devices 210 capable of generating an energy beam 202, such as a laser, maser, ultrasonic, and/or any other type of energy beams, can be used to accelerate or decelerate electrons in atoms in cavity 206, thereby generating a signal 212 composed of multiple entangled particles. Controller 124 can be configured to control operation of energy beam device 210 to generate entangled particles at the frequencies desired to detect one or more characteristics of a target.

Figure 2B:
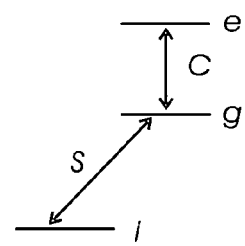
FIG. 2B is a diagram showing the energy levels for the atomic cavity waveform generator of FIG. 2A.

An example of an atom cavity 206 capable of generating multiple entangled particles is described in "Step-by-Step Engineered Multiparticle Entanglement" by Arno Rauschenbeutel, Gilles Nogues, Stefano Osnaghi, Patrice Bertet, Michel Brune, Jean-Michel Raimond, and Serge Haroche, Science Magazine, Vol. 288, Jun. 16, 2000, (hereafter referred to as "Rauschenbeutel" and incorporated by reference herein). FIG. 2B shows the relevant atomic levels e, g, and i of atoms in cavity 206. Atoms emitted by energy beam devices 210 are prepared in e or g atomic levels. The atoms cross cavity 206 resonant at frequency C on the e→g transition. Classical Rabi pulses at frequency S from pulse generator 214 can be applied on the atoms before and after they interact with cavity 206 to perform programmed transformations on each atomic state. The term Rabi pulses refers to an atom that cyclically absorbs and re-emits photons at resonance when illuminated by a coherent beam of photons.

A static electric field applied across mirrors 208 is used to control the atomic transition frequency through the Stark effect, which refers to the shift in, and broadening of, the spectral line structure of matter in the presence of an electric field. The residual photon number increases at the end of the sequence. The position of an atom can be determined with a precision that allows each atom to be addressed independently. The joint atom-photon state manipulations rely on the resonant quantum Rabi rotation experienced by each atom in cavity 206. Atom cavity system 200 undergoes oscillations between the states |e,0> and |g,1> (atom in e or g with either zero or one photon). The full effective atom cavity interaction time corresponds to a $2\pi$ Rabi pulse. Shorter interaction times are obtained by using the Stark effect to switch the atomic transition away from cavity resonance at preset times. An entangled state is achieved by combining Rabi pulses of various durations on successive atoms.

Figure 3A:
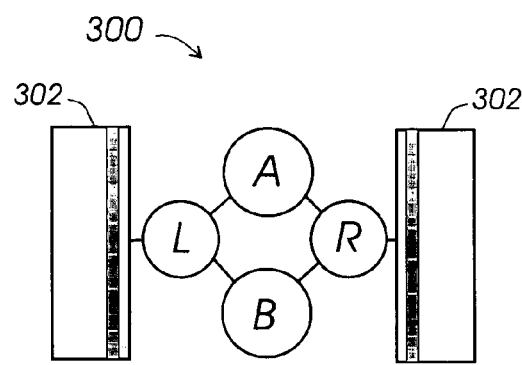
FIGS. 3A is a diagram of another embodiment of a waveform generator that can be used in the radar system of FIG. 1.
Figure 3B:
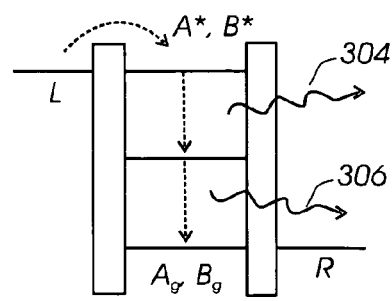
FIG. 3B is a diagram showing the energy levels for the waveform generator of FIG. 3A.

Referring now to FIGS. 3A and 3B, another embodiment of a waveform generator 300 configured to generate multiphoton waveforms using quantum dots (A, B, L, R) that can be used in radar system 100 is shown. Quantum Dots (QDs) are very small semiconductor structures on the order of nanometers or somewhat larger in diameter that confine electrons and holes in three spatial dimensions and to a very small number of energy levels, depending on their size. A QD is larger than an atom but behaves as if it were one, releasing its trapped electron-hole pair to an adjacent conductor when it captures an incident photon.

A publication entitled "Entangled Microwaves From Quantum Dots" by C. Emary, B. Trauzettel, and C. W. J. Beenakker, Instituut-Lorentz, Universiteit Leiden, P.O. Box 9506, 2300 RA Leiden, The Netherlands, (Feb. 23, 2005) (referred to herein as "Emary" and incorporated by reference herein) discloses examples of techniques for producing polarization-entangled microwaves using intra-band transitions in a pair of quantum dots. The techniques do not rely on spin-orbit coupling or on control over electron-electron interactions. The quantum correlation of microwave polarizations is obtained from orbital degrees of freedom in an external magnetic field.

FIG. 3A shows four quantum dots A, B, L, R, arranged between two electron reservoirs 302. In the embodiment shown, quantum dot L is coupled to one of electron reservoirs 302 and quantum dots A and B, as discussed in Emary. Quantum dot R is coupled to the other electron reservoir 302 as well as quantum dots A and B. There is no direct coupling between quantum dots L and R, or A and B.

FIG. 3B shows the positions of quantum dot levels for quantum dots A, B, L, R. An electron tunnels through the single level in dot L into a superposition $\alpha|A^*>+\beta|B^*>$ of upper levels in dots A and B. The electron decays to the ground state with the emission of two photons. The resulting state $\alpha|A_g>|++>\beta|B_g>|-->$ encodes the state of the quantum dot L onto pairs of photons with left or right circular polarization. Subsequent tunneling of the electron out of the lower levels into quantum dot R establishes a unique final state for the electron, thus separating the quantum dot field wave function and liberating a pair of entangled particles 304, 306.

Figure 3C:
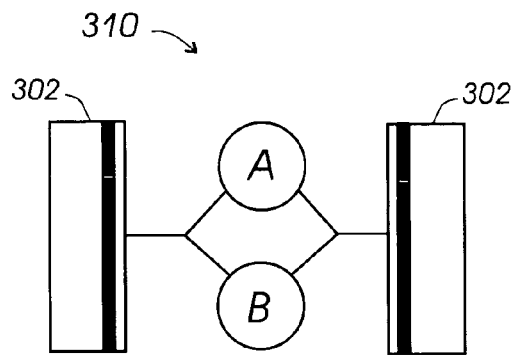
FIG. 3C is a diagram of an alternate embodiment of the waveform generator of FIG. 3A.

FIG. 3C shows another embodiment of a waveform generator 310 configured to generate multiphoton waveforms using only two dots, with dots L and R being replaced by Y-junction connections. The quantum dots A and B are connected to within a Fermi wavelength of each other at the Y-junctions to ensure that an electron tunnels coherently into both quantum dots A and B, as further described in Emary.

Figure 3D:
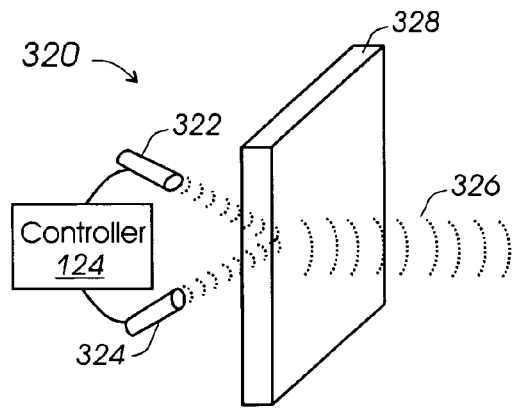
FIG. 3D is a diagram of an alternate embodiment of the waveform generator of FIG. 3A.

Another publication entitled "Creating Excitonic Entanglement In Quantum Dots Through The Optical Stark Effect" by Ahsan Nazir, Brendon W. Lovett, and G. Andrew D. Briggs, Department of Materials, Oxford University, Oxford OX1 3PH, United Kingdom, Nov. 3, 2004, and incorporated by reference herein, discloses that two initially non-resonant quantum dots may be brought into resonance by the application of a single detuned laser. In some systems, such as an embodiment of system 320 shown in FIG. 3D, one laser 322 can be used to trigger or generate the photons, and another laser 324 can be used to couple the emitted photons in an entangled RF wave 326. Note that some embodiments can include an array 328 of quantum dots and triggering and coupling lasers 320, 322. A corresponding number of additional lasers 320, 322 can be used to generate more than two entangled particles.

Figure 4:
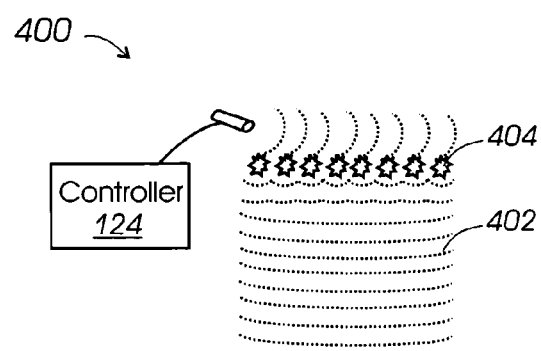
FIG. 4 is a diagram of another embodiment of a waveform generator that can be used in the radar system of FIG. 1.

Referring now to FIG. 4, another embodiment of waveform generator 400 configured to generate multiphoton waveforms 402 using Bose-Einstein condensates (BECs) 404 that can be used in radar system 100 is shown. BECs 404 are comprised of a group of atoms that exist in exactly the same state. Methods to produce entangled states of several particles from a BEC 404 are described in "Many-Particle Entanglement With Bose-Einstein Condensates" by A. Sørensen, L. -M. Duan, J. I. Cirac & P. Zoll, Nature 409, 63 (2001), incorporated by reference herein, using atom-atom interactions and/or spin-exchange collisions to create entangled particles in multiphoton waveforms 402. The publication "Creating Massive Entanglement of Bose-Einstein Condensed Atoms" by Kristian Helmerson and Li You, Physical Review Letters, Volume 87, Number 17, Oct. 22, 2001, incorporated by reference herein, further proposes using a Raman process that couples the atoms through intermediate molecular states to entangle a large number of particles.

Note that other suitable methods for generating multiphoton waveforms can be used in radar system 100 in addition to, or instead of BECs 404, quantum dot systems 300, and atom cavity systems 200.

Referring again to FIG. 1, controller 124 can be configured to perform a modulating function by controlling a laser or other energy source in waveform generator 104 to transmit pulsed or continuous multiphoton waveforms. Additionally, waveform generator 104 can be controlled to vary one or more properties of successive entangled photon waveforms so that either or both the frequency and the property of interest can be detected to correlate emitted and return signals.

Figure 5:
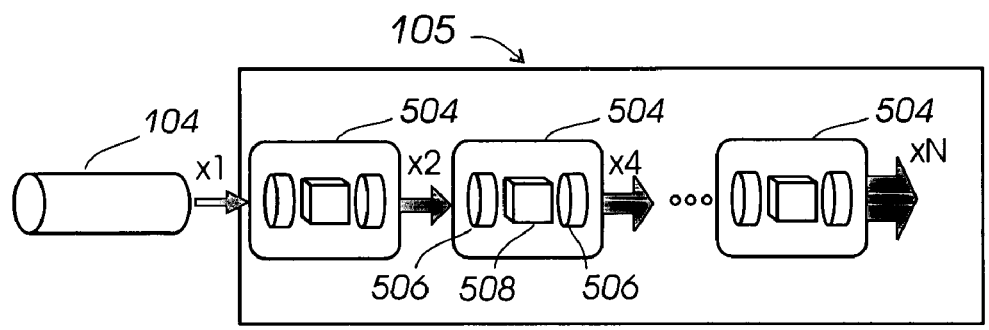
FIG. 5 is a diagram of another embodiment of a photomultiplier tube that can be used in the transmitter portion of the radar system of FIG. 1.

Referring now to FIGS. 1 and 5, FIG. 5 shows an embodiment of downconverter 500 configured to generate multiphoton waveforms that can be used in radar system 100 of FIG. 1. Waveform generator 104 generates single and/or multi entangled photon waveforms. The photon(s) are input to downconverter 500, which, in the embodiment shown, includes one or more doubly-resonant amplifiers (DRA) 504. Each DRA 504 increases the number of entangled photons by a factor of two while downconverting the frequencies of the photons by a factor of two. DRA 504 includes a cavity formed by mirrors 506 on opposite sides of a phase-matched nonlinear crystal 508. The photon of the incident waveform is divided into two photons, the sum energy of which is equivalent to the energy of the photon waveform from waveform generator 104 by nonlinear optical crystal 508. The wavelengths of the two generated photon waveforms are determined by the phase matching condition, which is changed by the angle between the incident photon waveform from waveform generator 104 and the axes of crystal 508. The wavelengths of the signal and the idler waveforms can, therefore, be tuned by changing the phase matching condition.

Note that downconverter 105 can include as many DRAs 504 as required to generate the desired number of entangled photons. Additionally, one or more switch(es) (not shown) may be included between DRAs 504 to divert the entangled photon waveforms to duplexer 108 instead of through the remaining DRAs 504, thus providing the capability to dynamically vary the number of entangled photons used. Controller 124 can be configured to operate the switch(es) based on performance and/or power requirements.

Positioning system 130 can be operated by controller 124 in coordination with waveform generator 104 and downconverter 105 to achieve desired radar beam shapes and to focus the emitted signal in a particular direction. The desired radar beam shapes can be indicated by an automatically and/or manually actuated radar mode switch coupled to provide input to controller 124.

Figure 6:
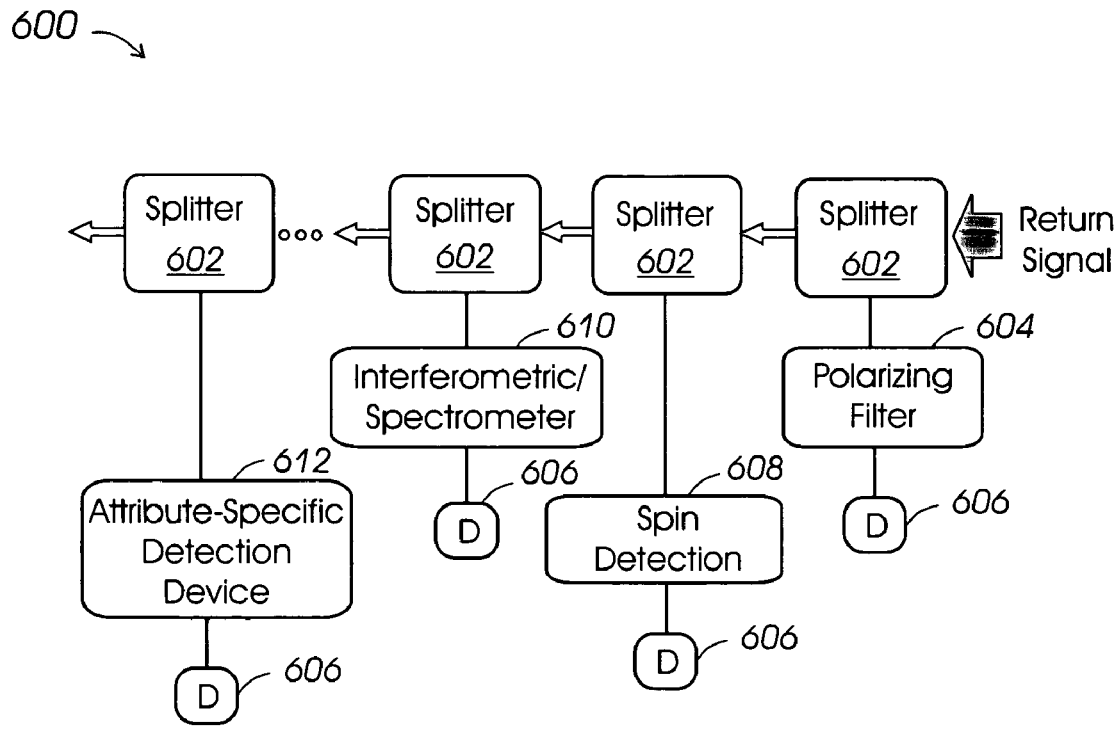
FIG. 6 is a diagram of an embodiment of a series of devices that can be utilized in the radar system of FIG. 1 to detect various attributes of the entangled photons in the return signal.

Referring now to FIGS. 1 and 6, FIG. 6 shows a diagram of an embodiment of a detector system 600 that can be used as detector 112 in radar system 100. The return signal is comprised of multiple entangled photons, which are separated by a series of beam splitters 602. Since measuring an attribute of an entangled photon alters the attribute, the number splitters 602 included in detector system 600 depends on the number of attributes of the entangled photons to be measured. In the embodiment shown, photons deflected by the series of splitters 602 are input to corresponding attribute-specific detection devices 612, such as polarizing filter 604, spin detection device 608, and interferometer/spectrometer 610.

Polarizing filter 604 indicates the polarization of the photons in the return signal and can be used to determine the direction of a radar target's velocity vector. Spin detection device 608, such as a Stern-Gerlach device, indicates the spin of the photons in the return signal. The level of spin can be used to determine the magnitude of the target's velocity vector. Measurements from interferometer/spectrometer 610 can be used to determine the phase and analyze spectral properties of the photons in the return signal. The phase angle can be used to determine azimuth and elevation of the target, as well as the Doppler shift of the return signal. Spectral analysis can be used to determine the material composition of the target. Other devices suitable to measure specific attributes of the photons in the return signal can be used. Such a configuration allows entangled photons to be separated and attributes to be measured independently of one another, that is, without affecting other attributes of the entangled photons.

Figure 7:
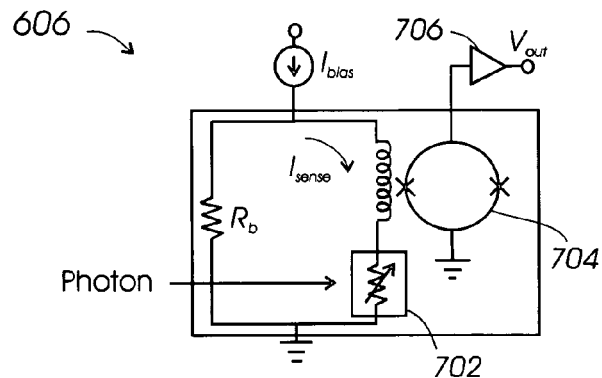
FIG. 7 is a diagram of an embodiment of a single photon detector that can be utilized in the radar system of FIG. 1.

A photon detector 606 can be included with each attribute-specific detection device 612 to count the number of photons with the detected attribute. The detected number can be used to determine a statistical estimate of the number of photons in the return signal with that specific attribute. A schematic diagram representing an example of detector 612 capable of detecting single photons is shown in FIG. 7 and described in a publication entitled "Demonstration Of A Low-Noise Near-infrared Photon Counter With Multi-photon Discrimination," by Aaron J. Miller, Sae Woo Nam, John M. Martinis, and Alexander V. Sergienko, Applied Physics Letters, Volume 83, Number 4 (Jul. 28, 2003) and incorporated by reference herein. Detector 606 includes a superconducting absorbing material 702 that uses transition edge sensor (TES) microcalorimeter technology to produce an electrical signal proportional to the heat produced by the absorption of a photon from the return signal. Absorbing material 702 can be configured as a metal film, such as tungsten, with very narrow superconducting-to-normal resistive transition characteristics. Applying a voltage across the metal film causes the film to self-bias in the resistive transition allowing its temperature to be determined by measuring the electrical current flow through the metal. The integral of the current pulse is proportional to the energy deposited in the absorbing material 702 from the photon in the return signal. The voltage bias for detector 606 is provided by current source ($I_{bias}$) and a shunt resistor ($R_b$). The detector signal/$_{sense}$ is amplified by one or more amplifiers 704, such as an array of SQUID amplifiers, and processed with pulse shaping electronics 706. Note that other suitable types of detectors 606 can be used.

Referring again to FIG. 1, the information available from attribute-specific detection devices 612 (FIG. 6) can be provided to signal quality processor 116. Signal quality processor 116 can filter noise out of the signals, and perform other functions to condition the signals to provide the most information available to signal data processor 120. In some embodiments, signal quality processor 116 can measure the fidelity of the return signal and distinguish the return signal from noise using a photonic lattice or other suitable structure.

Signal/data processor 120 coherently combines the pulses within each return signal to obtain a sharpened image that can be presented on display 122. Image analysis logic can be included in signal processor 120 to determine the type of target(s) shown in the image, as well as to determine speed, direction, number, and other attributes of the target(s).

Components in processing system 100 can be embodied in any suitable device(s) using any suitable combination of firmware, software, and/or hardware, such as microprocessors, Field Programmable Gate Arrays (FPGAs), Application Specific Integrated Circuit (ASICs), or other suitable devices.

The ability to propagate radar signals at frequencies that are independent of the resolution frequency may allow quantum radar system 100 to attain near zero attenuation rates in the atmosphere, and greatly diminished attenuation rates in other media including foliage, building materials, earthen layers, etc. Quantum radar system 100, thus, can be adapted to visualize useful target details through background and/or camouflaging clutter, through plasma shrouds around hypersonic air vehicles, through the layers of concealment hiding underground facilities, IEDs, mines, and other threats—all while operating from an airborne platform or other suitable platform. Quantum radar system 100 may also improve the performance of advanced image processing and pattern recognition systems, as well as defeat most RF signature management systems when the propagation frequency is tuned to the resonant wave length of the target.

Figure 8:
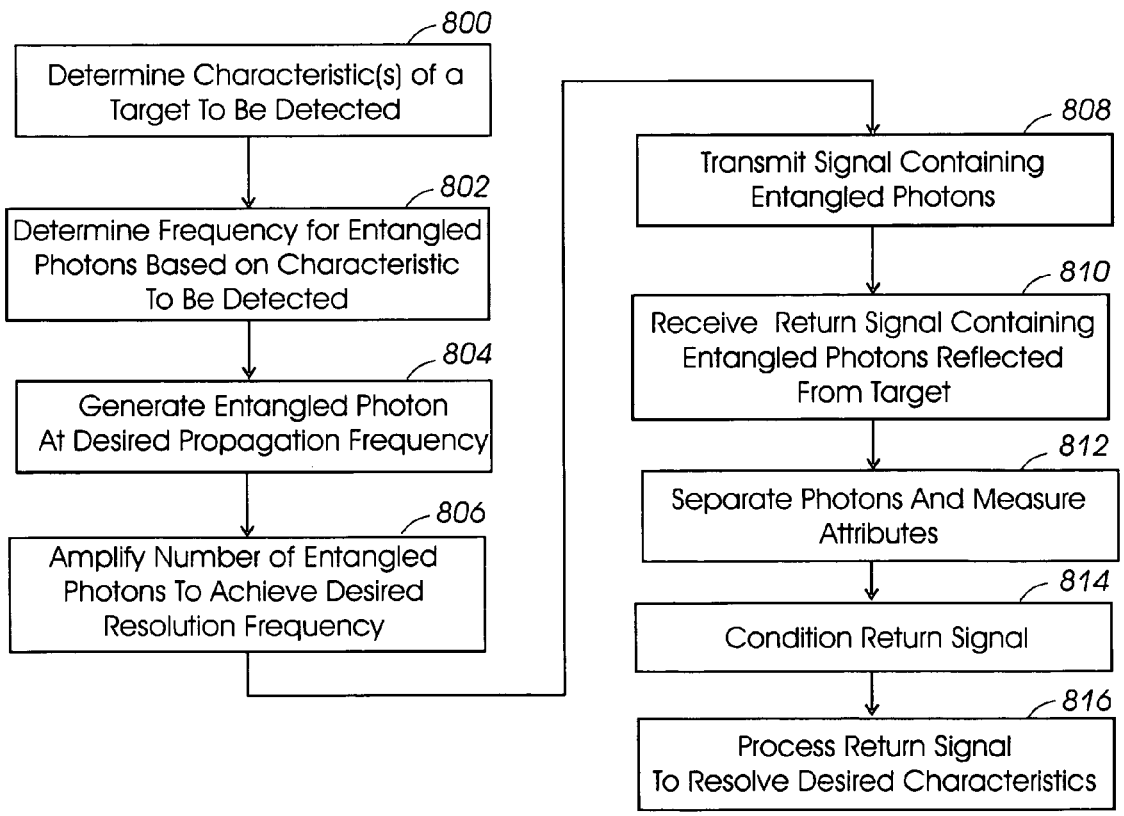
FIG. 8 is a flow diagram of an embodiment of a process for generating a signal comprising entangled photons and receiving a return signal comprising the entangled photons reflected from a target that can be utilized in the radar system of FIG. 1.

FIG. 8 is a flow diagram of an embodiment of a process for generating a signal comprising entangled photons and receiving a return signal comprising the entangled photons reflected from a target that can be utilized in the radar system 100 of FIG. 1. Process 800 can include determining one or more characteristics of target(s) to be detected. The characteristics can include distance, azimuth and elevation, material composition, type of target, high/medium/low resolution images, traveling speed and direction, and other suitable characteristics. One or more mode selection switches can be provided for an operator to dynamically select one or more of the characteristics to be detected. Further, components in radar system 100 such as controller 124 can be configured to automatically add and/or switch modes based on the operating mode(s) of other devices, such as aircraft, space platform, or other device, with which radar system 100 can be utilized.

Process 802 can include determining wavelength/frequency for the entangled photons based on characteristic(s) to be detected. For example, if detailed images of the target(s) are desired, process 802 determines a suitable wavelength and corresponding frequency for the photons based on the characteristic to be detected. The desired frequency/wavelength can be adjusted automatically based on operational mode of the radar system 100.

Different frequencies can be used for different propagation mediums such as air, water, vacuum, foliage, ground, and buildings. Process 804 includes generating the entangled photon(s) at the desired propagation frequency once the propagation medium is provided or determined. For example the propagation medium can be provided manually through operator input or determined automatically based on sensor data and/or image analysis. Various types of sensors can be used to detect whether the radar beams are propagated through air, water, buildings, foliage, or other mediums (or combination of mediums). Once the propagation medium is known, a suitable propagation frequency can be determined. If the waveforms are propagated through a combination of mediums, controller 124 can include logic to determine the most suitable frequency, or weighted average of propagation frequencies to use.

Process 806 can include amplifying the number of entangled photons used in the radar beam required to achieve the desired resolution frequency. Process 806 can increase the number of photons, but the frequency of the photons will be lowered by a factor proportional to the increased number. Thus, changing the resolution frequency has little or no effect on the propagation frequency since the propagation frequency is the sum of the frequencies of the individual photons.

Process 808 includes transmitting the entangled photons in a radio-frequency signal, which is typically accomplished using antenna 106.

Process 810 includes receiving and detecting at least a portion of the entangled photons reflected by a target. In some embodiments, process 812 can separate one or more photons from the return signal by passing the return signal through a beam splitter. The return signal can pass through a series of beam splitters, and a single attribute or characteristic can be measured from each of the split signals. Note that measuring a particular attribute of an entangled photon will change the attribute. Process 810 thus allows each attributes/characteristics of interest to be measured without disturbing or changing the other attributes/characteristics.

Process 814 can perform one or more techniques to condition the return signal for further processing. In some embodiments, one or more filters can be used to remove noise components from the return signal. Alternatively or additionally, one or more amplifiers can be used to increase desired frequencies or other properties of the return signal. Other suitable conditioning techniques to facilitate gathering information from the return signal can be utilized in process 814.

Process 816 includes determining a characteristic of the target based on interaction between the target and the entangled photons. For example, the direction of a radar target's velocity vector can be determined from the polarization of the photons in the return signal. The level of spin can be used to determine the magnitude of the target's velocity vector. The phase angle can be used to determine azimuth and elevation of the target, as well as the Doppler shift of the return signal. Spectral analysis can be used to determine the material composition of the target. Information from other measured attributes of the photons in the return signal can be determined in process 816.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. Additionally, limitations set forth in publications incorporated by reference herein are not intended to limit the scope of the claims. In the claims, unless otherwise indicated the article "a" is to refer to "one or more than one".

We claim:

1. A sensor system comprising:
    an entangled quantum particle generator operable to generate a radio frequency signal including a plurality of entangled photons, wherein the wavelength of the signal is the sum of the wavelengths of the plurality of entangled photons;
    a photon detector configured to detect a return signal based on the signal being reflected by a target; and
    an attribute-specific detection device configured to determine a characteristic of the target based on information derived from at least one of the plurality of entangled particles in the return signal, wherein the frequency of the signal is selected to propagate the signal through a medium and the frequencies of the plurality of entangled photons are selected to provide sufficient data in the return signal to resolve the characteristic of the target.

2. The apparatus of claim 1, wherein the characteristic of the target includes at least one of the group consisting of: location, speed, direction of travel, distance to target, target image, target size, target area, target volume, target dimension(s), target cross-section, target surface roughness, and target material composition.

3. The apparatus of claim 1, wherein the entangled quantum particle generator is operable to vary the frequencies of the plurality of entangled particles.

4. The apparatus of claim 1, wherein the entangled quantum particle generator utilizes at least one of the group consisting of: quantum dots, Bose-Einstein condensates, and an atom cavity, to generate the entangled particles.

5. The apparatus of claim 1, wherein the entangled quantum particle generator is operable to vary the number of the plurality of entangled particles included in the signal.

6. The apparatus of claim 1, further comprising:
a downconverter operable to increase the number of photons in the signal, thereby decreasing the frequency of the entangled photons.

7. The apparatus of claim 6, wherein the downconverter includes an amplifier configured to increase the number of entangled photons and decrease the frequency of the plurality of the photons.

8. The apparatus of claim 1, further comprising:
a signal quality processor configured to receive a signal representing the return signal and to remove noise from the return signal.

9. The apparatus of claim 1, further comprising a positioning system operable to steer an antenna to radiate the signal in a desired direction and/or to detect the return signal from a desired direction.

10. The apparatus of claim 1, further comprising a duplexer configured to switch operation between transmitting the signal and receiving the return signal.

11. The apparatus of claim 1, wherein the signal/data processor is operable to determine distance to the target based the time the signal is emitted and the return signal is detected.

12. The apparatus of claim 1, further comprising a beam splitter configured to separate at least one photon from the return signal and provide the at least one photon to the attribute-specific detection device.

13. The apparatus of claim 1, further comprising a detector operable to detect at least one of the entangled particles in the return signal.

14. The apparatus of claim 1, further comprising a plurality of attribute-specific detection devices and a series of beam splitters, wherein the beam splitters are configured to separate at least one photon from the return signal and provide the at least one photon to a corresponding one of the attribute-specific detection devices.

15. The apparatus of claim 1, wherein the attribute-specific detection device includes at least one of the group consisting of: a polarizing filter, a spin detection device, a interferometer; and a spectrometer.

16. The apparatus of claim 1, wherein the entangled quantum particle generator is operable to generate the signal at frequencies that are independent of the entangled photons and different frequencies are selected for different propagation mediums including air, water, vacuum, foliage, ground, and buildings.

17. The apparatus of claim 1, further comprising the entangled quantum particle generator is operable to generate the entangled photons based on the signal propagation frequency once the propagation medium is determined.

18. The apparatus of claim 1, further comprising a controller operable to determine a weighted average of propagation frequencies to use when the signal is propagated through a combination of mediums.

19. The apparatus of claim 1, further comprising a mode selection switch operable to dynamically select one or more of the characteristics to be detected.

20. The apparatus of claim 1, further comprising a controller configured to automatically add and switch modes based on the operating mode of a device with which the system is utilized.

21. The apparatus of claim 1, further comprising the propagation frequency is tuned to the resonant wave length of the target.

22. A method comprising:
generating a plurality of entangled photons;
transmitting the entangled photons in a radio-frequency signal, wherein the frequency of the signal is selected to propagate through a particular medium and the number of the entangled photons is determined by the selected frequency of the signal; and
detecting at least a portion of the entangled photons reflected by a target.

23. The method of claim 22, further comprising:
selecting the frequency of the transmitted entangled photons to optimize target resolution achievable by detecting the entangled photons reflected by the target.

24. The method of claim 22, further comprising:
selecting an attribute of the photons to be entangled based on a characteristic of the target to be detected.

25. The method of claim 22, further comprising:
determining a characteristic of the target based on interaction between the target and the entangled photons.

26. The method of claim 22, further comprising:
compensating the information available from one of the entangled photons based on the difference in time between the one of the entangled photons and another of the entangled photons.

27. An apparatus comprising:
means for generating a plurality of entangled photons; and
means for transmitting the entangled photons in a radio-frequency signal, wherein the frequency of the photons is selected based on the target to be detected and the number of entangled photons is based on the medium through which the entangled photons will propagate.

* * * * *